United States Patent [19]

Rocholl

[11] 3,936,412

[45] Feb. 3, 1976

[54] THERMOSETTING SEALING MATERIALS

[75] Inventor: Martin-Gottfried Rocholl, Heidelberg, Germany

[73] Assignee: Teroson GmbH, Heidelberg, Germany

[22] Filed: Sept. 23, 1974

[21] Appl. No.: 508,636

[30] Foreign Application Priority Data

Oct. 18, 1973 Germany............................ 2352272

[52] U.S. Cl.......... 260/37 R; 260/37 SB; 260/37 N; 260/37 EP; 264/26
[51] Int. Cl.².................... C08L 81/00; C08L 75/00
[58] Field of Search............ 260/37 R, 37 N, 37 SB, 260/37 EP, 26, 38 R

[56] References Cited
UNITED STATES PATENTS

| | | | |
|---|---|---|---|
| 2,388,824 | 11/1945 | Brown.................................. | 264/26 |
| 2,922,865 | 1/1960 | Schattler et al.................... | 264/26 X |
| 3,640,913 | 2/1972 | Cerra................................ | 264/26 X |
| 3,847,771 | 11/1974 | McGinniss........................ | 260/37 N |

*Primary Examiner*—Lewis T. Jacobs
*Attorney, Agent, or Firm*—William L. Baker; C. Edward Parker

[57] ABSTRACT

Improved thermosetting sealing materials, for example polyurethane or polysulphide compositions which can be cured in a high frequency alternating electric field, are described which contain electrically non-conducting pigments and/or filler whose dielectric constant exceeds 200.

7 Claims, No Drawings

THERMOSETTING SEALING MATERIALS

The invention realtes to plastic or shaped materials which accompanied by heating in accelerated manner cross-link to give an elastic, elastoplastic or plastoelastic seal and thereby virtually reach their final state.

At present mainly self-curing sealing materials are used which are cured in situ at ambient temperature. The curing times are, however, relatively long which assumes great importance in continuous working methods. The curing time could be reduced by heating but hitherto such methods have rarely been used because with external heating by thermal radiation the substrate is also heated. This leads not only to considerable heat and time losses but also in the case of heat-sensitive substrates e.g. thermoplastics it can cause damage to the substrate.

It is in fact already known to heat plastics and more particularly sealing materials in such a way that an alternating magnetic or electric field is used in place of conventional thermal radiation. In the case of so-called inductive heating the alternating magnetic field induces eddy currents in an electrically conducting or ferromagnetic substrate leading to heating. In the thermosetting of sealing materials this effect can be utilized in that the sealing material is either applied to a metal substrate or alternatively ferromagnetic or electrically conducting particles are added to the sealing material itself. Both methods have been described in the prior art, for example in British Patent No. 1,196,543 and German Pat. Nos. 1,906,003 and 1,906,004.

However, the use of capacitive high frequency heating (or also dielectric heating) for curing conventional sealing materials is limited to cases where the sealing material contains sufficient polar compounds, whose reorientation in the alternating fields leads to the heating of the material. Capacitive high frequency heating is in fact already used for heating materials which are either non-conducting or have only a poor conductivity. Examples are to be found in wood drying plants, in the medical field for treating rheumatic illnesses (diathermia) and in the home where microwave ovens are becoming increasingly important, because foodstuffs with a protein and carbohydrate base are heated relatively quickly and in the high frequency field cook through due to the relatively high dipole moments. However, hitherto high frequency heating has not been used for curing sealing materials.

The objective of the present invention is to develop thermosetting sealing materials which can be cured by high frequency heating within a very short time. It has been found that this objective can be attained by adding to the sealing materials certain electrically non-conducting pigments and/or fillers whose dielectric constant is above a specified minimum value.

In the present invention, thermosetting sealing materials are prepared containing pigments and/or fillers which are characterized in that for curing in the high frequency alternating electric field they contain electrically non-conducting pigments and/or fillers whose dielectric constant $\epsilon$ exceeds 200, in addition to any conventional pigments and/or fillers which may be present. The dielectric constant is preferably between 1,000 and 20,000.

Particularly preferred fillers and/or pigments within the scope of the present invention are titanates, zirconates and stannates of the alkaline earth metals barium, strontium, calcium and magnesium as well as lead. More particularly suitable are barium titantate $BaTiO_3$ and mixed sintered products with $BaTiO_3$ as the main component, which may also contain $SrTiO_3$ and other oxides such as $SiO_2$ and $MnO_2$ in small quantities.

According to the invention the content of such pigments and/or fillers with a high dielectric constant is 0.1 to 20, preferably 0.5 to 10 and in particular 1 to 4 percent by weight, based on the total sealing material.

The sealing materials according to the invention are so-called thermosetting resinous sealing materials, which on heating are hardened or cross-linked in an accelerated manner. Examples of preferred sealing materials are two component polyurethane or polysulphide sealing materials. However, it is also possible to use sealing materials with a silicone or epoxide base. Plastic sealing materials which cross-link at higher temperatures can also be used.

The sealing materials contain the conventional additives such as e.g. hardeners, stabilizers, fillers and pigments. The fillers and/or pigments with high $\epsilon$-values above 200 which according to the invention are contained by the sealing materials can therefore either be the only fillers in the sealing material or they can be used with conventional fillers such as chalk, barite, carbon black, titanium dioxide and the like.

According to the invention thermosetting in the high frequency alternating electric field can be further accelerated in that in preparing the sealing materials polymers and/or cross-linking agents are used wherein the product of dielectric constant $\epsilon$ and loss factor tan $\delta$ is as large as possible. The same selection principles also apply to the optionally used plasticizers and other adjuvants e.g. stabilizers. However, limits are placed on this by the required mechanical and chemical properties of the sealing materials, whereby in addition it must be remembered that the dipole moments of organic compounds never reach high values similar to those of the pigments and fillers used according to the invention.

The success of the invention is based on the fact that alternating electric fields in polar substances synchronous with the frequency bring about a continuous reversal of polarity of the elementary particles. The amounts of energy liberated in the form of heat by this reversal of polarity is called the dielectric loss. The size of the loss is dependent on the voltage U, frequency $f$, capacitance C which is in turn proportional to the dielectric constant $\epsilon$ and the dielectric loss factor tan $\delta$, whereby $\delta$ is the so-called loss angle. The size of the power loss $P_V$ as the cause of heating is obtained from the equation $$P_V = U^2 \cdot 2\pi f \cdot C \cdot \tan \delta$$

whereby the dielectric constant $\epsilon$, which also determines the size of the capacitance C, and tan $\delta$ are dependent both on the frequency $f$ and the termperature.

Whereby the voltage U, frequency $f$ and electrode spacing are parameters of the h.f. generator, the dielectric constant $\epsilon$ and loss factor tan $\delta$ are properties of the particular material to be heated.

According to the invention the dielectric constant $\epsilon$ and loss factor tan $\delta$ are raised considerably compared with known sealing materials. This is brought about by:
1. Adding fillers with a maximum dielectric constant $\epsilon$
2. Using basic polymers, hardeners and plasticizers wherein $\epsilon$ and tan $\delta$ are as high as possible.

The dielectric constants of conventional basic polymers are between 2 and 10 with a measuring frequency of $10^6$. Certain strongly polar compounds which can in certain cases be used as additives e.g. ethylene glycol or glycerin have dielectric constants of 40 to 50.

The dielectric constants of conventional inorganic fillers e.g. calcium carbonate, aluminium oxide and titanium oxide are about 5 to 100 for the same measuring frequencies. The preferred inorganic compounds according to the invention, however, have dielectric constants of well over 200. The dielectric constant of barium titanate, produced industrially as a starting material for special ceramics reaches values of approximately 1,200 to 1,800. Special sintered products, partly produced from complicated mixtures of $BaTiO_3$ and $SrTiO_3$ with additions of other metal oxides have $\epsilon$ values up to 17,000.

Through using the sealing materials according to the invention with high $\epsilon$ and tan $\delta$ values considerable advantages are obtained for accelerated curing in the high frequency electric field. For a predetermined frequency of the h.f. generator the necessary power loss $P_v$ can be reached at a lower voltage U which leads to economies in the insulation of the h.f. installation.

However, if the voltage remains unchanged the time required for heating to a particular temperature is considerably reduced, so that simultaneously the crosslinking time is reduced. This greatly increases the production rate. Therefore manufacturing processes in which such h.f. sealing materials are used can be performed much more rationally.

The following examples serve to further explain the invention.

EXAMPLE I

Using the following formulation three test samples of a pourable two component polyurethane sealing material (grey color) were produced in a ratio A : B of 2 : 1 and are cured to 10 × 17 × 90 mm blocks.

| Component A | % by weight | Component B |
|---|---|---|
| Short-chained polyether alcohol (Desmophen 250U) | 2 – 8 | High-molecular weight Polyisocyanate (Desmodur E 14) |
| Phenol and cresol alkyl sulphonates (Mesamoll) | 25 – 35 | |
| Aralkylated phenol mixture for protection against ageing (KSM) | 0.1 – 1 | |
| Lead-2-n-ethylhexanoate (Octasoligen) | 0.4 – 1.8 | |
| Chalk | 40 – 50 | |
| Barite | 10 – 20 | |
| Titanium dioxide | 1– 5 | |
| Carbon black | 0.02 – 2 | |
| Barium titanate | 0.1 – 4 | |

The samples contained 0% by weight, 1% by weight and 4% by weight of $BaTiO_3$ (dielectric constant $\epsilon$ = approx. 1,700). They were heated between the plate electrodes of a capacitively heating h.f. installation. The temperature (maximum of the temperature curve) was measured with a thermistor after a 10 sec. heating period.

TABLE 1

| Test Samples | Voltage | Frequency | Plate Spacing | Time | Temperature |
|---|---|---|---|---|---|
| 2 comp. PU block without $BaTiO_3$ | 3 kV | 27 MHz | 21 mm | 10 sec. | 65°C |
| 2 comp. PU block with 1% $BaTiO_3$ | 3 kV | 27 MHz | 21 mm | 10 sec. | 83°C |
| 2 comp. PU block with 4% $BaTiO_3$ | 3 kV | 27 MHz | 21 mm | 10 sec. | 88°C |

EXAMPLE II

The mixed liquid components A and B of the polyurethane sealing material of Example 1 with 0, 1 and 4% by weight of $BaTiO_3$ were placed in a h.f. installation and both the heating and the necessary curing time were measured.

TABLE 2

| Test samples | Voltage | Frequency | Plate Spacing | Time | Temperature |
|---|---|---|---|---|---|
| Liquid mixture with 0% of $BaTiO_3$ in comp. A | 3 kV | 27 MHz | 23 mm | 25 sec. | 63°C |
| With 1% of $BaTiO_3$ in comp. A | 3 kV | 27 MHz | 23 mm | 8 sec | 62°C |
| With 4% of $BaTiO_3$ in comp. A | 3 kV | 27 MHz | 23 mm | 9 sec. | 79°C |

EXAMPLE III

Three mixtures of components A and B of the PU sealing material of Example 1 with 0, 1 and 4% of $BaTiO_3$ in component A in production tests were cured in a h.f. production installation and the production conditions determined:

TABLE 3

| Test samples | Voltage | Frequency | Electrode Length | Transit Time | Curing |
|---|---|---|---|---|---|
| With 0% of $BaTiO_3$ in comp. A | 5 kV | 27 MHz | 250 | 1'10" | slightly tacky |
| With 1% of $BaTiO_3$ in comp. A | 45 kV | 27 MHz | 250 | 50" | not tacky |
| With 4% of $BaTiO_3$ in comp. A | 4 kV | 27 MHz | 250 | 45" | not tacky |

EXAMPLE IV

Using the following formulation a smoothable two component polysulphide sealing material was produced. Components A and B were mixed in the ratio 10 : 1 and coated onto polyethylene cups. These samples were then capacitively heated between the electrodes of the h.f. installation under the following conditions.

| Component A | % by weight | Component B | % by weight |
|---|---|---|---|
| Liquid polysulphide polymer (thiocol) | 35 – 48 | $MnO_2$ | 20 – 30 |
| Phthalate softener | 3 – 10 | $PbO_2$ | 2 – 10 |
| Thixotropitishing paste | 4 – 10 | Phthalate softener | 40 – 50 |
| Titanium dioxide | 8 – 12 | Carbon Black | 0.5 – 2 |
| Chalk | 18 – 26 | Chalk | 15 – 25 |
| Aluminium silicate | 8 – 15 | | |
| Pyrogenic silicic acid | 0.4 – 1.5 | | |
| Adhesion promotor | 0.1 – 2 | | |
| Barium Titanate | 4 | | |

The results obtained are given in Table 4.

TABLE 4

| | Without h.f. heating | Without $BaTiO_3$ | With h.f. heating | With 4% $BaTiO_3$ |
|---|---|---|---|---|
| Voltage | | 3 kV | 3 kV | 3 kV | 3 kV |
| Frequency | | 27 MHz | 27 MHz | 27 MHz | 27 MHz |
| Electrode spacing | | 25 mm | 25 mm | 20 mm | 20 mm |
| Time | | 12 sec. | 12 sec. | 12 sec. | 20 sec. |
| Temperature 1 | 23°C | 33°C | 31.5°C | 33°C | 33°C |
| Temperature 2 | 23°C | 44°C | 49°C | 61°C | 83°C |
| Temperature difference | — | 11°C | 17.5°C | 28°C | 50°C |
| Surface not tacky | 6–8 h | 95' | 60' | 40' | 6' |
| Shore A hardness after 3 h | | 12° | 18° | 25° | 26° |
| Shore A hardness after 6 h | | 29° | 37° | 36° | 36° |
| Shore A hardness after 18 h | 28° | | | | |

It is claimed:

1. A thermosetting sealing composition especially adapted for curing in a high frequency alternating electric field, said composition comprising a thermosetting resinous sealant to which has been added electrically nonconducting pigments and/or fillers whose dielectric constant ε exceeds 200 in an amount sufficient to accelerate the thermosetting of said resinous sealant.

2. The sealing composition of claim 1 wherein the amount of said non-conducting pigment and/or filler having said dielectric constant exceeding 200 present is from 0.1 to 20 percent by weight of the composition.

3. The sealing composition of claim 1 wherein said dielectric constant is between 1000 and 20,000.

4. The sealing composition of claim 1, having in addition to said filler and/or pigment having said dielectric constant above 200, fillers and/or pigments whose dielectric constant is less than 200.

5. The sealing composition of claim 1 wherein said filler and/or pigment is $BaTiO_3$ or a mixed sintered product containing $BaTiO_3$ as the main component.

6. The sealing composition of claim 4 wherein said thermosetting resin has dielectric constant and tan δ values as high as possible.

7. The sealing composition of claim 4 additionally containing cross-linking agents and/or plasticizers and/or stabilizers whose dielectric constant and tan δ values are as high as possible.